(12) United States Patent
Kondo

(10) Patent No.: US 11,262,563 B2
(45) Date of Patent: Mar. 1, 2022

(54) IMAGING LENS AND IMAGING APPARATUS

(71) Applicant: FUJIFILM Corporation, Tokyo (JP)

(72) Inventor: Masato Kondo, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 150 days.

(21) Appl. No.: 16/847,170

(22) Filed: Apr. 13, 2020

(65) Prior Publication Data

US 2020/0333569 A1 Oct. 22, 2020

(30) Foreign Application Priority Data

Apr. 17, 2019 (JP) .............................. JP2019-078782

(51) Int. Cl.
| | | |
|---|---|---|
| G02B 15/177 | (2006.01) | |
| G02B 15/14 | (2006.01) | |
| G02B 27/00 | (2006.01) | |
| G02B 9/12 | (2006.01) | |
| G02B 9/24 | (2006.01) | |
| G02B 15/163 | (2006.01) | |
| G02B 15/20 | (2006.01) | |
| H04N 5/225 | (2006.01) | |
| G02B 9/64 | (2006.01) | |

(52) U.S. Cl.
CPC ............. *G02B 15/177* (2013.01); *G02B 9/12* (2013.01); *G02B 9/24* (2013.01); *G02B 15/143103* (2019.08); *G02B 15/163* (2013.01); *G02B 27/0025* (2013.01); *G02B 9/64* (2013.01); *G02B 15/20* (2013.01); *H04N 5/2254* (2013.01)

(58) Field of Classification Search
CPC ...... G02B 15/177; G02B 9/12; G02B 15/163; G02B 15/20; G02B 27/0025; G02B 9/24; G02B 9/64; G02B 15/143103; G02B 15/15
USPC ......................................................... 359/689
See application file for complete search history.

(56) References Cited

U.S. PATENT DOCUMENTS

| | | |
|---|---|---|
| 2012/0069456 A1 | 3/2012 | Suzuki |
| 2014/0334015 A1 | 11/2014 | Suzuki |
| 2017/0075089 A1 | 3/2017 | Nagami et al. |

FOREIGN PATENT DOCUMENTS

| | | |
|---|---|---|
| JP | 2012-063676 A | 3/2012 |
| JP | 2013-156459 A | 8/2013 |
| JP | 2014-219587 A | 11/2014 |
| JP | 2017-054078 A | 3/2017 |

*Primary Examiner* — Kristina M Deherrera
(74) *Attorney, Agent, or Firm* — Studebaker & Brackett PC

(57) ABSTRACT

The imaging lens consists of, in order from the object side, a first positive lens group, a stop, a second positive lens group, and a third negative lens group. During focusing, the first lens group and the second lens group move integrally. The first lens group consists of three or less lenses. The first lens group includes a cemented lens in which a negative lens and a positive lens are cemented in order from the object side. The third lens group consists of, in order from the object side, a negative aspheric lens, a negative lens, and a positive lens. The lens closest to the image side in the second lens group is a biconvex lens, and the imaging lens satisfies a predetermined conditional expression regarding the radius of curvature of the surface of the biconvex lens.

15 Claims, 12 Drawing Sheets

EXAMPLE 1

EXAMPLE 2

EXAMPLE 4

EXAMPLE 5

IMAGING LENS AND IMAGING APPARATUS

CROSS-REFERENCE TO RELATED APPLICATIONS

The present application claims priority under 35 U.S.C. § 119 to Japanese Patent Application No. 2019-078782, filed on Apr. 17, 2019. The above application is hereby expressly incorporated by reference, in its entirety, into the present application.

BACKGROUND OF THE INVENTION

1. Field of the Invention

The present disclosure relates to an imaging lens and an imaging apparatus.

2. Description of the Related Art

In the related art, as imaging lenses applicable to imaging apparatuses such as a digital camera, imaging lenses described in JP2012-063676A, JP2017-054078A, JP2014-219587A, and JP2013-156459A have been proposed. JP2012-063676A, JP2017-054078A, and JP2014-219587A each disclose an imaging lens comprising, in order from the object side to the image side, a first lens group having a positive refractive power, a stop, a second lens group having a positive refractive power, and a third lens group having a refractive power. JP2013-156459A discloses an imaging lens comprising, in order from the object side to the image side, a front group of a first lens group having a positive refractive power, an aperture stop, a rear group of a first lens group having a positive refractive power, and a second lens group having a negative refractive power.

SUMMARY OF THE INVENTION

As the imaging lens applied to the imaging apparatus, a lens which has a small F number, has a high resolution, and has a small size so as to ensure favorable portability of the imaging apparatus is required. JP2012-063676A and JP2017-054078A each describe a lens system having a focal length equivalent to 35 mm or 28 mm in a case where the focal length is converted in terms of a 35 mm silver halide film camera. However, the lens systems described in JP2012-063676A and JP2017-054078A each have room for improvement in correcting field curvature and astigmatism in order to achieve a high resolution recently required. The lens systems described in JP2014-219587A and JP2013-156459A each have an F number of 2.8 or more, which is not a sufficiently small F number, and the total length of the lens system as a lens for recent digital camera is long.

The present disclosure has been made in view of the above circumstances, and it is an object to provide an imaging lens having a small F number, a high resolution, and high optical performance while being configured to have a small size, and an imaging apparatus comprising the imaging lens.

An imaging lens according to an aspect of the present disclosure consists of, in order from an object side to an image side: a first lens group having a positive refractive power; a stop; a second lens group having a positive refractive power; and a third lens group having a negative refractive power. During focusing, the first lens group and the second lens group move along an optical axis integrally, and the third lens group remains stationary with respect to an image plane. The first lens group consists of three or less lenses. A lens surface closest to the object side in the first lens group is convex. The first lens group includes a cemented lens in which a negative lens and a positive lens are cemented in order from the object side and of which a cemented surface is convex toward the object side. The second lens group includes a cemented lens, in which at least one negative lens and at least one positive lens are cemented, and a lens different from the cemented lens. A lens closest to the image side in the second lens group is a biconvex lens. The third lens group consists of, in order from the object side to the image side, an aspheric lens having a negative refractive power, a negative lens, and a positive lens. In addition, it is preferable that assuming that a paraxial radius of curvature of an object side surface of the biconvex lens closest to the image side in the second lens group is Ra and a paraxial radius of curvature of an image side surface of the biconvex lens of the second lens group is Rb, Conditional Expression (1) is satisfied.

$$0<(Ra+Rb)/(Ra-Rb)<1 \quad (1)$$

It is more preferable that the imaging lens of the aspect satisfies Conditional Expression (1-1).

$$0<(Ra+Rb)/(Ra-Rb)<0.3 \quad (1\text{-}1)$$

In the imaging lens of the above aspect, assuming that an F number of the imaging lens is FNo, a sum of a distance on the optical axis from a lens surface closest to the object side to a lens surface closest to the image side and a back focal length of the imaging lens at an air conversion distance in a state in which an object at infinity is in focus is TL, and a maximum image height is Ymax, it is preferable that Conditional Expression (2) is satisfied, and it is more preferable that Conditional Expression (2-1) be satisfied.

$$3.5<FNo \times TL/Y\text{max}<7 \quad (2)$$

$$4<FNo \times TL/Y\text{max}<6 \quad (2\text{-}1)$$

In the imaging lens of the above aspect, assuming that a combined focal length of the first lens group and the second lens group is fG12, and a focal length of the imaging lens in a state where an object at infinity is in focus is f, it is preferable that Conditional Expression (3) is satisfied, and it is more preferable that Conditional Expression (3-1) be satisfied.

$$0.6<fG12/f<0.9 \quad (3)$$

$$0.6<fG12/f<0.85 \quad (3\text{-}1)$$

In the imaging lens of the above aspect, assuming that a focal length of the imaging lens in a state where an object at infinity is in focus is f, and a maximum image height is Ymax, it is preferable that Conditional Expression (4) is satisfied, and it is more preferable that Conditional Expression (4-1) be satisfied.

$$1<f/Y\text{max}<1.8 \quad (4)$$

$$1.45<f/Y\text{max}<1.7 \quad (4\text{-}1)$$

In the imaging lens of the above aspect, it is preferable that a lens surface closest to the object side in the second lens group is a concave surface.

In the imaging lens of the above aspect, the second lens group may be configured to consist of, in order from the object side to the image side, a negative lens concave toward the object side, a positive lens convex toward the image side, and an aspheric lens.

In the imaging lens of the above aspect, assuming a paraxial radius of curvature of an image side surface of a lens which is second from the image side of the second lens group is Rc and a paraxial radius of curvature of an object side surface of the biconvex lens of the second lens group is Ra, it is preferable that Conditional Expression (5) is satisfied, and it is more preferable that Conditional Expression (5-1) is satisfied.

$$-0.5<(Rc+Ra)/(Rc-Ra)<0.5 \quad (5)$$

$$0.45<(Rc+Ra)/(Rc-Ra)<0.45 \quad (5-1)$$

In the imaging lens of the above aspect, a refractive index of the biconvex lens closest to the image side in the second lens group with respect to the d line is Nd23, it is preferable that Conditional Expression (6) is satisfied, and it is more preferable that Conditional Expression (6-1) is satisfied.

$$1.75<Nd23 \quad (6)$$

$$1.8<Nd23<2.2 \quad (6-1)$$

An imaging apparatus according to another aspect of the present disclosure comprises the imaging lens according to the above aspect of the present disclosure.

In the present specification, it should be noted that the terms "consisting of ~" and "consists of ~" mean that the lens may include not only the above-mentioned elements but also lenses substantially having no refractive powers, optical elements, which are not lenses, such as a stop, a filter, and a cover glass, and mechanism parts such as a lens flange, a lens barrel, an imaging element, and a camera shaking correction mechanism.

It should be noted that, in the present specification, the term "~ group having a positive refractive power" means that the group has a positive refractive power as a whole. Similarly, the term "~ group having a negative refractive power" means that the group has a negative refractive power as a whole. The term "a lens having a positive refractive power" and the term "a positive lens" are synonymous. The term "a lens having a negative refractive power" and the term "negative lens" are synonymous. The "~ lens group" is not limited to a configuration using a plurality of lenses, but may consist of only one lens. The "single lens" means one uncemented lens.

A compound aspheric lens (a lens in which a spherical lens and an aspherical film formed on the spherical lens are integrally formed and function as one aspheric lens as a whole) is not regarded as cemented lenses, but the compound aspheric lens is regarded as a single lens. Unless otherwise specified, the sign of refractive power, the surface shape, and the radius of curvature of a lens including an aspheric surface are considered in terms of the paraxial region. Regarding the sign of the radius of curvature, the sign of the radius of curvature of the surface convex toward the object side is positive and the sign of the radius of curvature of the surface convex toward the image side is negative.

The "back focal length at the air conversion distance" used in the conditional expression is the air conversion distance on the optical axis from the lens surface closest to the image side surface to the image-side focal position. The "focal length" used in a conditional expression is a paraxial focal length. The values used in Conditional Expressions are values in a case where the d line is used as a reference in a state where the object at infinity is in focus unless otherwise specified. The "d line", "C line", and "g line" described in the present specification are emission lines. The wavelength of the d line is 587.56 nm (nanometers) and the wavelength of the C line is 656.27 nm (nanometers), and the wavelength of g line is 435.84 nm (nanometers).

According to the present disclosure, it is possible to provide an imaging lens having a small F number, a high resolution, and high optical performance while being configured to have a small size, and an imaging apparatus comprising the imaging lens.

DESCRIPTION OF THE PREFERRED EMBODIMENTS

Figure 1:
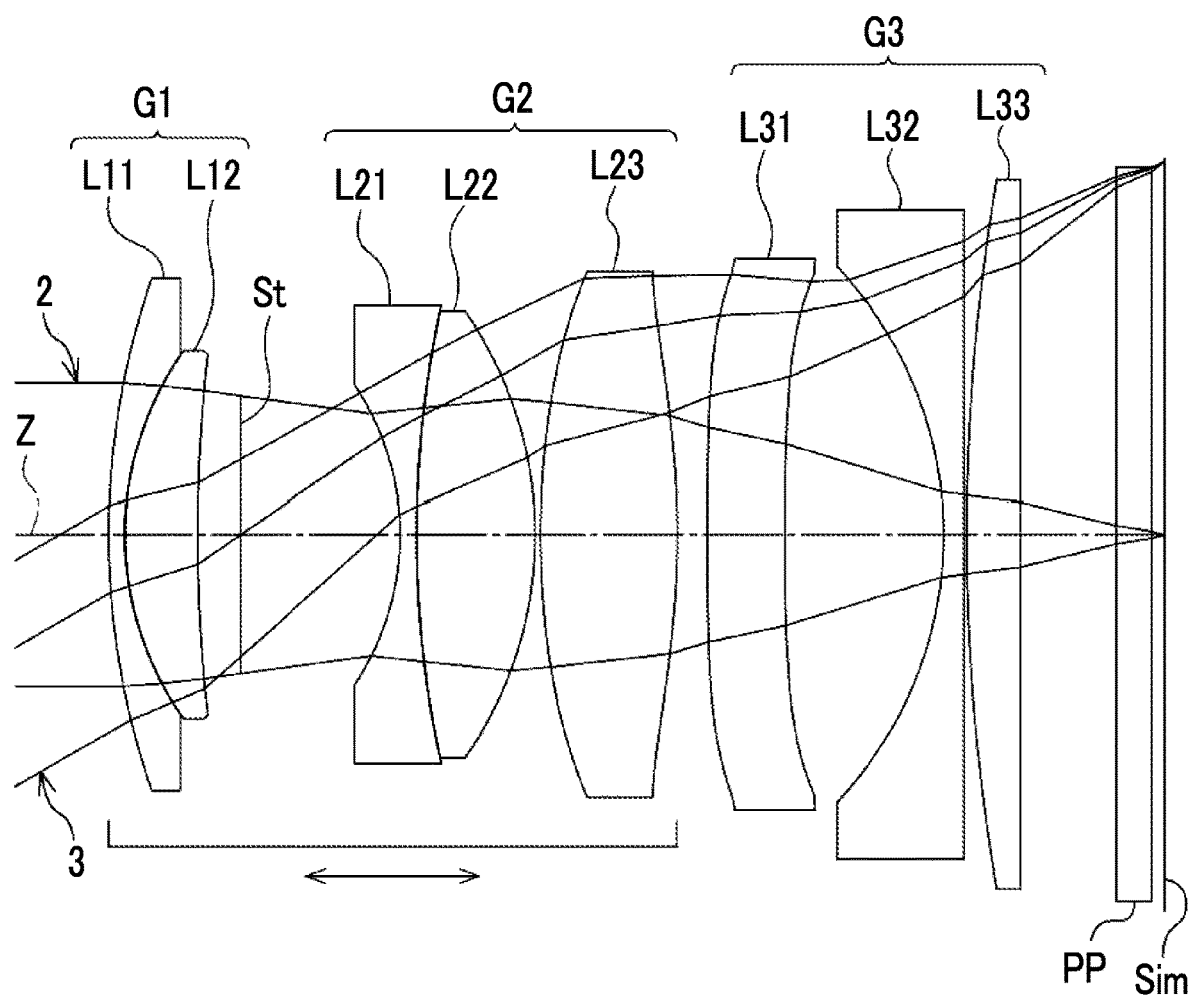
FIG. 1 is a cross-sectional view showing a configuration and rays of an imaging lens according to an embodiment of the present disclosure corresponding to an imaging lens of Example 1 of the present disclosure.

Hereinafter, embodiments of the present disclosure will be described in detail with reference to the accompanying drawings. FIG. 1 is a cross-sectional view showing a configuration of an imaging lens according to an embodiment of the present disclosure. The example shown in FIG. 1 corresponds to the imaging lens of Example 1 to be described later. In FIG. 1, the left side is the object side, the right side is the image side, and a state in which an object at infinity is in focus is shown. FIG. 1 also shows on-axis rays 2 and rays with the maximum angle of view 3 as the rays.

FIG. 1 shows an example in which, assuming that an imaging lens is applied to an imaging apparatus, an optical member PP having a parallel plate shape is disposed on the image side of the imaging lens. The optical member PP is a member assumed to include at various filters, a cover glass, and/or the like. The various filters include, for example, a low pass filter, an infrared cut filter, and a filter that cuts a specific wavelength region. The optical member PP has no refractive power, and the optical member PP may be configured to be omitted.

The imaging lens of the present disclosure consists of, in order from the object side to the image side along the optical axis Z, a first lens group G1 having a positive refractive power, an aperture stop St, a second lens group G2 having a positive refractive power, and a third lens group G3 having a negative refractive power. It should be noted that the aperture stop St shown in FIG. 1 does not indicate a shape thereof, but indicates a position thereof on the optical axis.

This imaging lens is advantageous in reducing the total length of the lens system by adopting a telephoto type configuration in which positive, positive, and negative lens groups are arranged in order from the object side to the image side. Since the Petzval sum generated by the positive first lens group G1 and the positive second lens group G2 can be reduced by the Petzval sum generated by the negative third lens group G3, there is an advantage in suppressing the Petzval sum of the entire imaging lens. Thereby, there is an advantage in suppressing field curvature. By disposing the aperture stop St between the first lens group G1 and the second lens group G2, compared with a case where the aperture stop St is disposed on the image side of this position, the incident angle of the principal ray of the off-axis rays to the image plane Sim can be reduced. Therefore, it is not necessary to increase the back focal length in order to reduce the incident angle. As a result, there is an advantage in shortening the total length of the lens system.

In the imaging lens of the present disclosure, during focusing, the first lens group G1 and the second lens group G2 move integrally along the optical axis Z, and the third lens group G3 remains stationary with respect to the image plane Sim. Here, the phrase "move integrally" means to move by the same amount in the same direction at the same time. Compared with a configuration in which the entire imaging lens is moved during focusing, the imaging lens of the present disclosure is able to reduce the load on the driving mechanism related to focusing. Thus, there is an advantage in reducing the size of the apparatus. Parentheses and double arrows below the first lens group G1 and the second lens group G2 shown in FIG. 1 indicate focus groups that move integrally in a case where the first lens group G1 and the second lens group G2 are in focus.

For example, in the imaging lens shown in FIG. 1, the first lens group G1 consists of two lenses L11 and L12 in order from the object side to the image side, the second lens group G2 consists of three lenses L21 to L23 in order from the object side to the image side, and the third lens group G3 consists of three lenses L31 to L33 in order from the object side to the image side. However, the number of lenses constituting the first lens group G1 and the second lens group G2 may be different from that in the example shown in FIG. 1.

Here, the first lens group G1 is configured to consist of three or less lenses. By reducing the number of lenses constituting the first lens group G1 to three or less, there is an advantage in reducing the size thereof. The lens surface closest to the object side in the first lens group G1 is a convex surface, and this configuration is also advantageous in reducing the size thereof. The first lens group G1 includes a cemented lens in which a negative lens and a positive lens are cemented in order from the object side and of which the cemented surface is convex toward the object side. By cementing the negative lens and the positive lens, there is an advantage in correcting chromatic aberration and reducing the size thereof. Further, by cementing the negative lens and the positive lens in order from the object side and forming the cemented surface convex toward the object side, there is an advantage in suppressing the occurrence of spherical aberration difference due to wavelength. In addition, there is an advantage in correcting astigmatism and lateral chromatic aberration, and there is also an advantage in widening the angle.

The second lens group G2 is configured to include a cemented lens, in which at least one negative lens and at least one positive lens are cemented, and a lens different from the cemented lens. Since the second lens group G2 includes at least one set of cemented lenses, there is an advantage in correcting chromatic aberration. Further, since the second lens group G2 includes a lens different from the cemented lens, there is an advantage in correcting aberrations. When the second lens group G2 includes an aspheric lens as a lens different from the cemented lens, there is an advantage in correcting field curvature and astigmatism. Further, the lens closest to the image side in the second lens group G2 is configured to be a biconvex lens having a biconvex shape. This configuration is advantageous in suppressing the occurrence of spherical aberration.

It is preferable that the lens surface closest to the object side in the second lens group G2 is a concave surface. In this case, the concave surface and the convex surface of the image side surface of the biconvex lens closest to the image side in the second lens group G2 are able to prevent the off-axis rays from being largely refracted. Thus, it is possible to suppress the amount of occurrence of aberrations.

For example, the second lens group G2 is composed of, in order from the object side to the image side, three lenses including a negative lens concave toward the object side, a positive lens convex toward the image side, and an aspheric lens. In the second lens group G2, arranging a negative lens and a positive lens in order from the object side is advantageous in correcting chromatic aberration. The object side surface of the negative lens closest to the object side in the second lens group G2 is formed as a concave surface, and the image side surface of the positive lens continuously disposed on the image side of the negative lens is formed as a convex surface. Thereby, it is possible to prevent the off-axis rays from being greatly refracted. As a result, it is possible to suppress the amount of occurrence of aberrations. Disposing an aspheric lens closest to the image side in the second lens group G2 is advantageous in correcting astigmatism. Further, limiting the number of lenses constituting the second lens group G2 to three is advantageous in shortening the total length of the lens system.

The third lens group G3 is configured to consist of, in order from the object side to the image side, an aspheric lens having a negative refractive power, a negative lens, and a positive lens. The aspheric lens of the third lens group G3 is advantageous in correcting astigmatism. The Petzval sum generated by the positive first lens group G1 and the positive second lens group G2 can be reduced by the negative lens continuously disposed on the image side of the aspheric lens. Thus, the Petzval sum of the entire imaging lens can be reduced. Thereby, there is an advantage in correcting field curvature. Disposing the positive lens closest to the image side in the third lens group G3 is advantageous in correcting distortion.

Next, a configuration relating to the conditional expressions will be described. In the imaging lens of the present disclosure, assuming that a paraxial radius of curvature of an object side surface of the biconvex lens of the second lens group G2 is Ra and a paraxial radius of curvature of an image side surface of the biconvex lens of the second lens group G2 is Rb, Conditional Expression (1) is satisfied. By not allowing the result of Conditional Expression (1) to be equal to or less than the lower limit, it is possible to suppress occurrence of astigmatism. By not allowing the result of Conditional Expression (1) to be equal to or greater than the upper limit, it is possible to prevent the refractive power of the image side surface of the biconvex lens closest to the image side in the second lens group G2 from becoming too strong. Thus, it is possible to suppress spherical aberration. In addition, in a case of a configuration in which Conditional Expression (1-1) is satisfied, it is possible to obtain more favorable characteristics.

$$0<(Ra+Rb)/(Ra-Rb)<1 \tag{1}$$

$$0<(Ra+Rb)/(Ra-Rb)<0.3 \tag{1-1}$$

Assuming that an F number of the imaging lens is FNo, a sum of a distance on the optical axis from a lens surface closest to the object side of the imaging lens to a lens surface closest to the image side of the imaging lens and a back focal length of the imaging lens at the air conversion distance in a state in which an object at infinity is in focus is TL (hereinafter referred to as a total length of the lens system), and a maximum image height is Ymax, it is preferable that Conditional Expression (2) is satisfied. It should be noted that FNo used in Conditional Expression (2) is an open F number. By not allowing the result of Conditional Expression (2) to be equal to or less than the lower limit, the F number is prevented from becoming excessively small with respect to the image height. Thus, aberration such as spherical aberration can be easily corrected. By not allowing the result of Conditional Expression (2) to be equal to or greater than the upper limit, the total length of the lens system is prevented from becoming excessively long with respect to the image height. Thereby, there is an advantage in reducing the size thereof or in realizing an optical system having a small F number. In addition, in a case of a configuration in which Conditional Expression (2-1) is satisfied, it is possible to obtain more favorable characteristics.

$$3.5<FNo \times TL/Y\text{max}<7 \tag{2}$$

$$4<FNo \times TL/Y\text{max}<6 \tag{2-1}$$

Assuming that a combined focal length of the first lens group G1 and the second lens group G2 is fG12 and a focal length of the imaging lens in a state where an object at infinity is in focus is f, it is preferable that Conditional Expression (3) is satisfied. By not allowing the result of Conditional Expression (3) to be equal to or less than the lower limit, there is an advantage in reducing fluctuation in aberrations during focusing. By not allowing the result of Conditional Expression (3) to be equal to or greater than the upper limit, it becomes easy to shorten an amount of movement of the focus group during focusing. Thus, there is an advantage in reducing the size thereof. In addition, in a case of a configuration in which Conditional Expression (3-1) is satisfied, it is possible to obtain more favorable characteristics.

$$0.6<fG12/f<0.9 \tag{3}$$

$$0.6<fG12/f<0.85 \tag{3-1}$$

Assuming that a focal length of the imaging lens is f in a state where an object at infinity is in focus and the maximum image height is Ymax, it is preferable that Conditional Expression (4) is satisfied. By not allowing the result of Conditional Expression (4) to be equal to or less than the lower limit, the focal length is prevented from becoming excessively short. Thus, the wide angle is prevented from becoming excessive. Thus, there is an advantage in correcting field curvature. By not allowing the result of Conditional Expression (4) to be equal to or greater than the upper limit, the focal length is prevented from becoming excessively long. Thus, there is an advantage in shortening the total length of the lens system. In addition, in a case of a configuration in which Conditional Expression (4-1) is satisfied, it is possible to obtain more favorable characteristics.

$$1<f/Y\text{max}<1.8 \tag{4}$$

$$1.45<f/Y\text{max}<1.7 \tag{4-1}$$

Assuming a paraxial radius of curvature of an image side surface of a lens which is second from the image side of the second lens group G2 is Rc and the paraxial radius of curvature of the object side surface of the biconvex lens closest to the image side in the second lens group G2 is Ra, it is preferable that Conditional Expression (5) is satisfied. By not allowing the result of Conditional Expression (5) to be equal to or less than the lower limit, it is possible to suppress occurrence of spherical aberration. By not allowing the result of Conditional Expression (5) to be equal to or greater than the upper limit, it is possible to suppress occurrence of astigmatism. In addition, in a case of a configuration in which Conditional Expression (5-1) is satisfied, it is possible to obtain more favorable characteristics.

$$-0.5<(Rc+Ra)/(Rc-Ra)<0.5 \tag{5}$$

$$0.45<(Rc+Ra)/(Rc-Ra)<0.45 \tag{5-1}$$

Assuming that a refractive index of the biconvex lens closest to the image side in the second lens group G2 with respect to the d line is Nd23, it is preferable that Conditional Expression (6) is satisfied. By not allowing the result of Conditional Expression (6) to be equal to or less than the lower limit, there is an advantage in shortening the total length, and there is an advantage in suppressing the spherical aberration from being insufficiently corrected. Further, it is more preferable that Conditional Expression (6-1) is satisfied. By not allowing the result of Conditional Expression (6-1) to be equal to or less than the lower limit, there is an advantage in shortening the total length, and there is an advantage in suppressing the spherical aberration from being insufficiently corrected. By not allowing the result of Conditional Expression (6-1) to be equal to or greater than the upper limit, there is an advantage in suppressing spherical aberration from being insufficiently corrected.

$$1.75<Nd23 \tag{6}$$

$$1.8<Nd23<2.2 \tag{6-1}$$

The above-mentioned preferred configurations and available configurations including the configurations relating to the conditional expressions may be any combination, and it is preferable to selectively adopt the configurations in accordance with required specification. According to the present disclosure, it is possible to realize an imaging lens having a small F number, a high resolution, and high optical performance while being configured to have a small size. It should be noted that the term "small F number" described herein means that the F number is 2.5 or less.

Next, examples of the imaging lens of the present disclosure will be described.

Example 1

Figure 2:
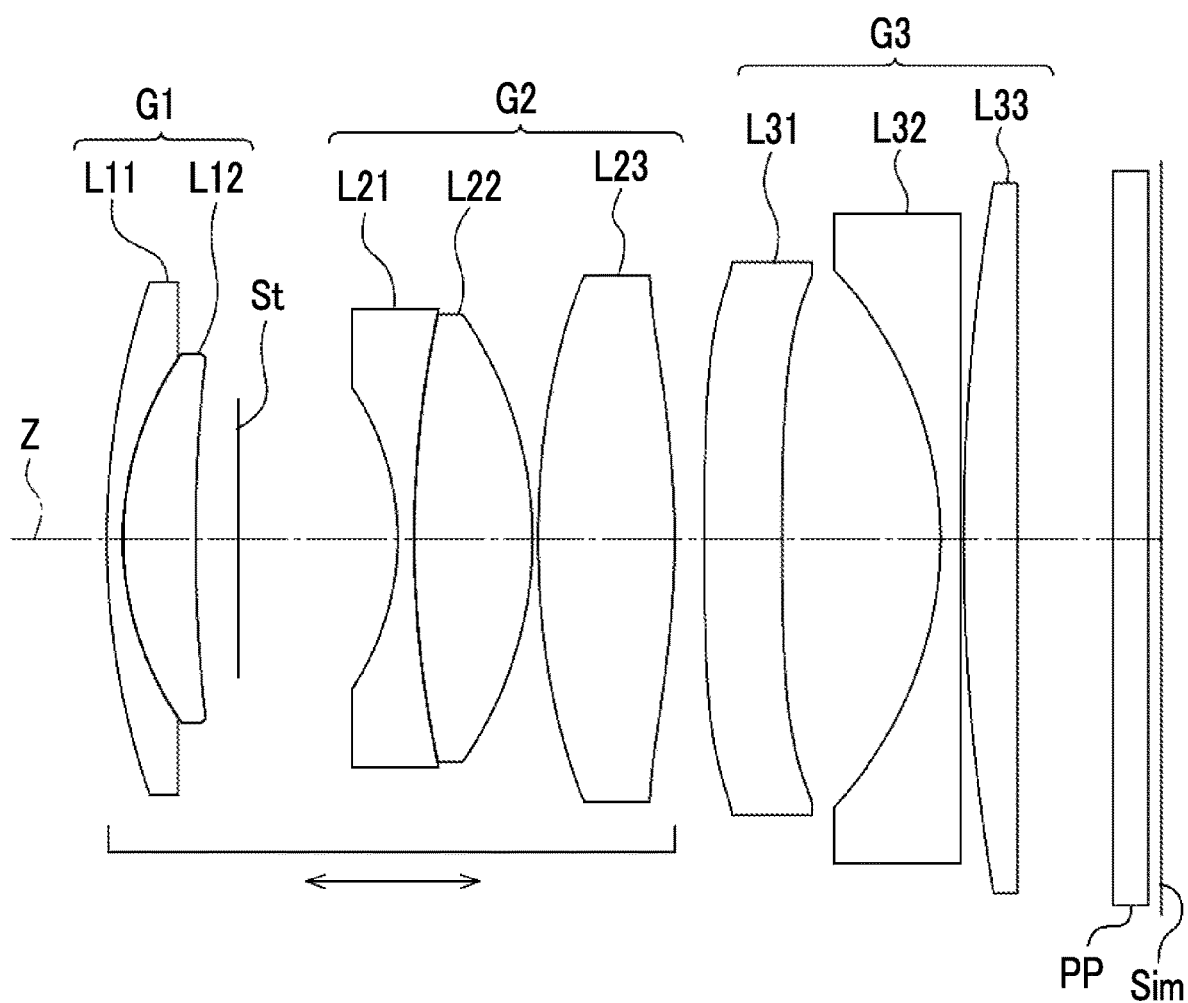
FIG. 2 is a cross-sectional view showing a configuration and rays of the imaging lens according to Example 1 of the present disclosure.

FIG. 2 is a cross-sectional view showing a configuration of the imaging lens of Example 1. FIG. 2 differs from FIG. 1 in that the rays are not shown, but the basic illustration method and configuration are as described above. Thus, a repeated description is partially omitted herein. The imaging lens of Example 1 consists of, in order from the object side to the image side, a first lens group G1 having a positive refractive power, an aperture stop St, a second lens group G2 having a positive refractive power, and a third lens group G3 having negative refractive power. During focusing from the object at infinity to the object at the closest distance, the first lens group G1 and the second lens group G2 move integrally along the optical axis Z, and the third lens group G3 remains stationary with respect to the image plane Sim. The first lens group G1 consists of two lenses L11 and L12 in order from the object side to the image side. The second lens group G2 consists of three lenses L21 to L23 in order from the object side to the image side. The third lens group G3 consists of three lenses L31 to L33 in order from the object side to the image side. The lens L11 and the lens L12 are cemented to each other. The lens L21 and the lens L22 are cemented to each other. The lens L22 and the lens L23 are arranged with an air gap interposed therebetween. The lens L23 and the lens L31 are aspheric lenses. The outline of the imaging lens of Example 1 has been described above.

Regarding the imaging lens of Example 1, Table 1 shows basic lens data, Table 2 shows specification, and Table 3 shows aspheric surface coefficients thereof. In Table 1, the column of Sn shows surface numbers. The surface closest to the object side is the first surface, and the surface numbers increase one by one toward the image side. The column of R shows radii of curvature of the respective surfaces. The column of D shows surface distances on the optical axis between the respective surfaces and the surfaces adjacent to the image side. Further, the column of Nd shows refractive indices of the respective components at the d line, and the column of vd shows Abbe numbers of the respective components on the d line basis.

In Table 1, the sign of the radius of curvature of the surface convex toward the object side is positive and the sign of the radius of curvature of the surface convex toward the image side is negative. Table 1 also shows the aperture stop St and the optical member PP. In Table 1, in a place of a surface number of a surface corresponding to the aperture stop St, the surface number and a term of (St) are noted. A value at the bottom place of D in Table 1 indicates a distance between the image plane Sim and the surface closest to the image side in the table.

Table 2 shows the focal length f of the imaging lens, the back focal length Bf at the air conversion distance, and the F number FNo., the maximum total angle of view $2\omega$, the total length of the lens system TL, and the maximum image height Ymax on the d line basis.)(° in the place of $2\omega$ indicates that the unit thereof is a degree. The values shown in Table 2 are values in the case of using the d line as a reference in a state where the object at infinity is in focus. It should be noted that the F number FNo. shown in Table 2 and the aberration diagrams described later corresponds to the F number FNo used in Conditional Expression (2).

In Table 1, the reference sign * is attached to surface numbers of aspheric surfaces, and numerical values of the paraxial radius of curvature are written into the column of the radius of curvature of the aspheric surface. In Table 3, the row of Sn shows surface numbers of the aspheric surfaces, and the rows of KA and Am shows numerical values of the aspheric surface coefficients for each aspheric surface. It should be noted that m is an integer of 3 or more, and varies in accordance with the surface. For example, m=3, 4, 5, . . . , 20 for the aspheric surfaces of Example 1. The "E±n" (n: an integer) in numerical values of the aspheric surface coefficients of Table 3 indicates "×10$^{±n}$". KA and Am are the aspheric surface coefficients in the aspheric surface expression represented by the following expression.

$$Zd = C \times h^2 / \{1 + (1 - KA \times C^2 \times h^2)^{1/2}\} + \Sigma Am \times hm$$

Here, Zd is an aspheric surface depth (a length of a perpendicular from a point on an aspheric surface at height h to a plane that is perpendicular to the optical axis and contacts with the vertex of the aspheric surface), h is a height (a distance from the optical axis to the lens surface), C is an inverse of a paraxial radius of curvature, and KA and Am are aspheric surface coefficients, and $\Sigma$ in the aspheric surface expression means the sum with respect to m.

In data of each table, a degree is used as a unit of an angle, and mm (millimeter) is used as a unit of a length, but appropriate different units may be used since the optical system can be used even in a case where the system is enlarged or reduced in proportion. Each of the following tables shows numerical values rounded off to predetermined decimal places.

TABLE 1

Example 1

| Sn | R | D | Nd | vd |
|---|---|---|---|---|
| 1 | 30.98019 | 0.590 | 1.71736 | 29.51 |
| 2 | 12.42900 | 2.670 | 1.88300 | 39.22 |
| 3 | 64.17602 | 1.570 | | |
| 4(St) | ∞ | 5.880 | | |
| 5 | −10.58606 | 0.610 | 1.69895 | 30.05 |
| 6 | 42.29500 | 4.350 | 1.77250 | 49.61 |
| 7 | −15.33039 | 0.200 | | |
| *8 | 34.72225 | 5.000 | 1.80780 | 40.86 |
| *9 | −33.47682 | 1.100 | | |
| *10 | 666.57127 | 2.840 | 1.51633 | 64.06 |
| *11 | 135.03773 | 5.860 | | |
| 12 | −15.17144 | 0.740 | 1.69895 | 30.05 |
| 13 | ∞ | 0.100 | | |
| 14 | 82.50113 | 1.980 | 1.88300 | 39.22 |
| 15 | ∞ | 3.504 | | |
| 16 | ∞ | 1.300 | 1.51680 | 64.20 |
| 17 | ∞ | 0.500 | | |

TABLE 2

Example 1

| | |
|---|---|
| f | 23.689 |
| Bf | 4.861 |
| FNo. | 2.06 |
| 2ω(°) | 62.0 |
| TL | 38.35 |
| Ymax | 14.20 |

TABLE 3

| | Example 1 | | | |
|---|---|---|---|---|
| Sn | 8 | 9 | 10 | 11 |
| KA | 1.0000000E+00 | 1.0000000E+00 | 1.0000000E+00 | 1.0000000E+00 |
| A3 | −1.5217964E−04 | 4.6707088E−04 | 6.9988571E−04 | −2.3771611E−04 |
| A4 | 2.4706739E−04 | −1.0166693E−04 | −7.8490068E−05 | 1.7211189E−04 |
| A5 | −1.9986864E−04 | 3.6407193E−05 | −2.3476671E−05 | −4.3702546E−06 |
| A6 | 1.0534079E−04 | −1.3756074E−05 | 1.7123418E−05 | −1.5476285E−05 |
| A7 | −3.4430391E−05 | 5.1076177E−06 | −4.1267936E−06 | 5.2884500E−06 |
| A8 | 6.9668708E−06 | −1.2536522E−06 | 5.0213388E−07 | −6.7258964E−07 |
| A9 | −8.2587997E−07 | 1.9023164E−07 | −1.9486235E−09 | 1.3917510E−09 |
| A10 | 4.6910827E−08 | −1.5587710E−08 | −8.2542881E−09 | 1.0109269E−08 |
| A11 | −5.7981580E−10 | 2.8140078E−10 | 1.0151630E−09 | −1.2035642E−09 |
| A12 | 2.2371123E−10 | 3.2636450E−11 | −3.1786078E−11 | 5.9393956E−11 |
| A13 | −6.8464232E−11 | 5.0343516E−12 | −2.6828331E−12 | −3.9309708E−12 |
| A14 | 7.0551541E−12 | −1.2681241E−12 | 1.9590923E−13 | 6.5830604E−13 |
| A15 | −3.2955028E−13 | 8.7906193E−14 | 6.6935119E−15 | −5.2709876E−14 |
| A16 | 6.0646736E−15 | −2.0482602E−15 | −8.5735230E−16 | 1.1668344E−15 |
| A17 | −3.1163867E−18 | −4.9884016E−19 | −4.4918245E−18 | 2.1822742E−17 |
| A18 | −7.1851751E−19 | 5.2732620E−19 | 1.6151998E−18 | 3.5346850E−19 |
| A19 | 1.1695193E−20 | −1.8316881E−19 | 8.0183252E−20 | 3.5695647E−19 |
| A20 | 1.8644650E−21 | 8.4138980E−21 | −8.8086271E−21 | −3.5705496E−20 |

Figure 7:
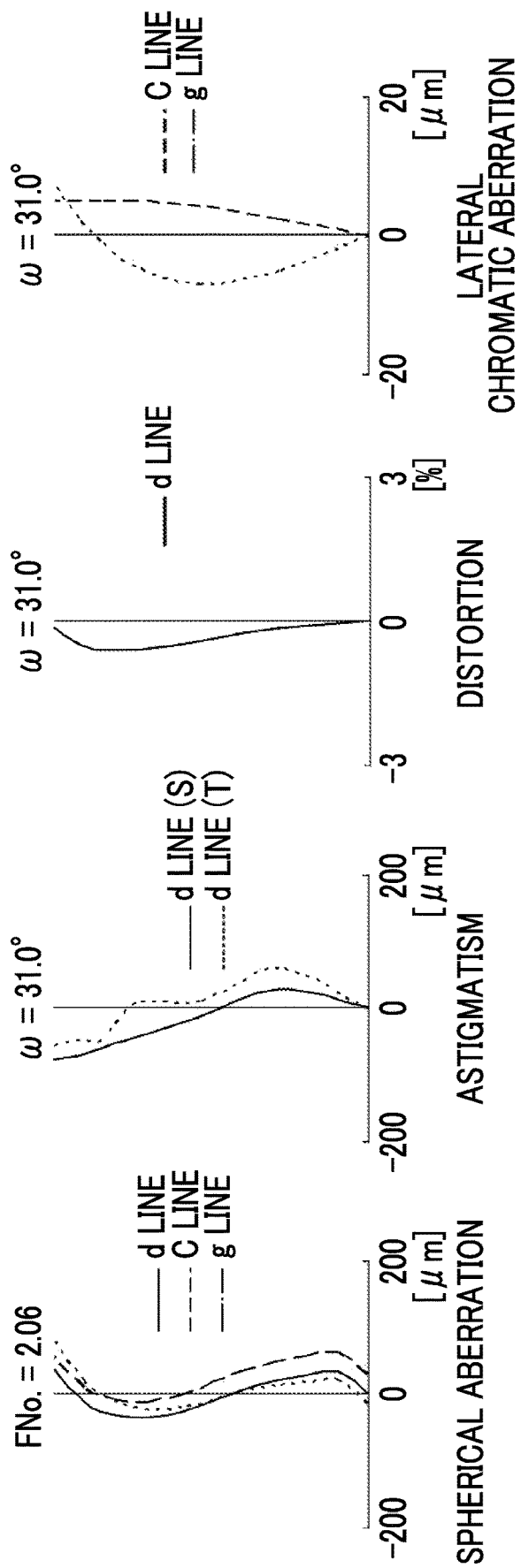
FIG. 7 is a diagram of aberrations of the imaging lens of Example 1 of the present disclosure.

FIG. 7 shows a diagram of aberrations of the imaging lens of Example 1. In FIG. 7, in order from the left side, spherical aberration, astigmatism, distortion, and lateral chromatic aberration are shown. In the spherical aberration diagram, aberrations at the d line, the C line, and the g line are indicated by the solid line, the long dashed line, and the chain line, respectively. In the astigmatism diagram, aberration in the sagittal direction at the d line is indicated by the solid line, and aberration in the tangential direction at the d line is indicated by the short dashed line. In the distortion diagram, aberration at the d line is indicated by the solid line. In lateral chromatic aberration, aberrations at the C line, and the g line are respectively indicated by the long dashed line, and the chain line. In the spherical aberration diagram, FNo. indicates an F number. In the other aberration diagrams, to indicates a half angle of view.

Symbols, meanings, description methods, and illustration methods of the respective data pieces according to Example 1 are the same as those in the following examples unless otherwise noted. Therefore, in the following description, repeated description will be omitted.

Example 2

Figure 3:
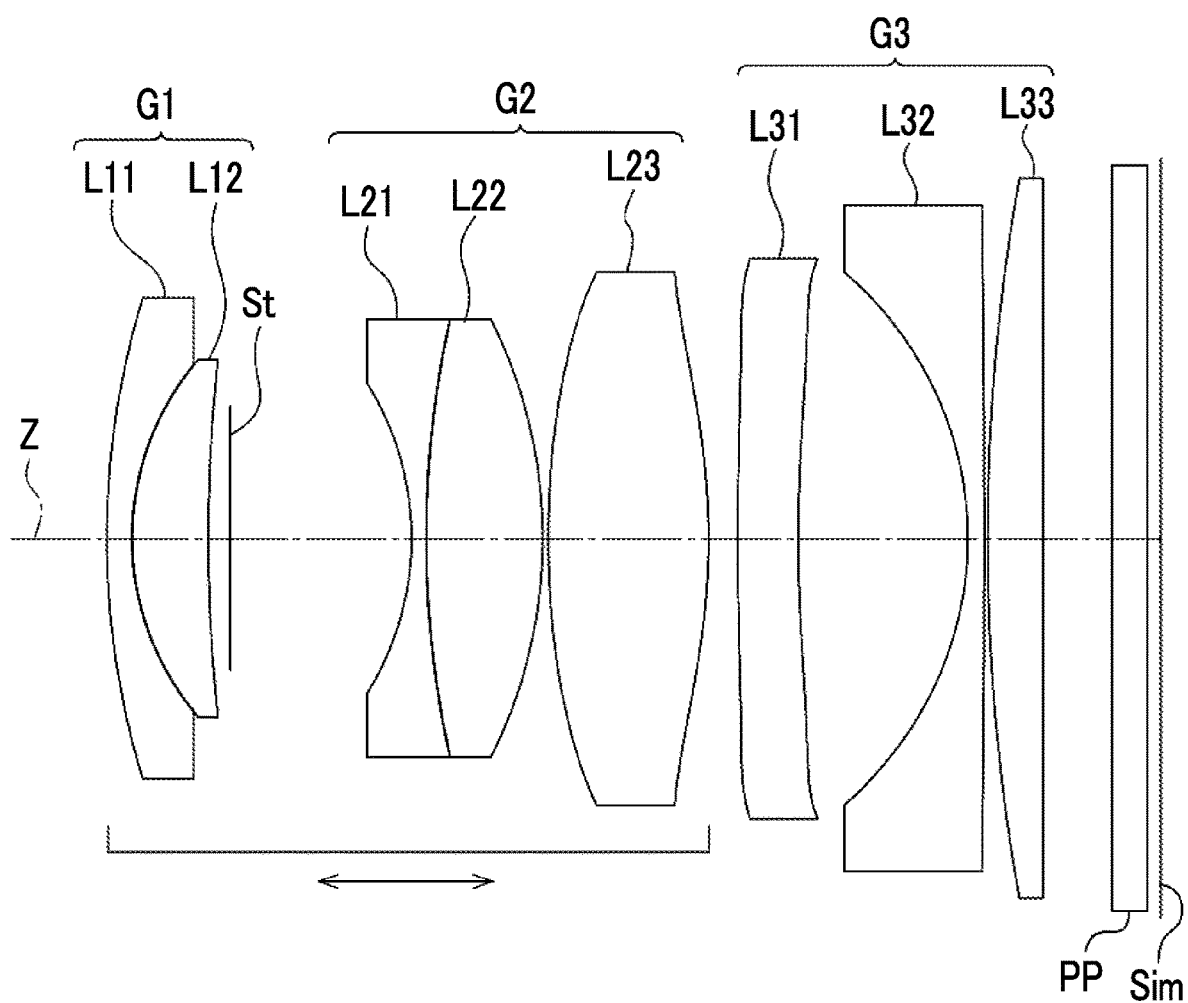
FIG. 3 is a cross-sectional view showing a configuration and rays of an imaging lens according to Example 2 of the present disclosure.
Figure 8:
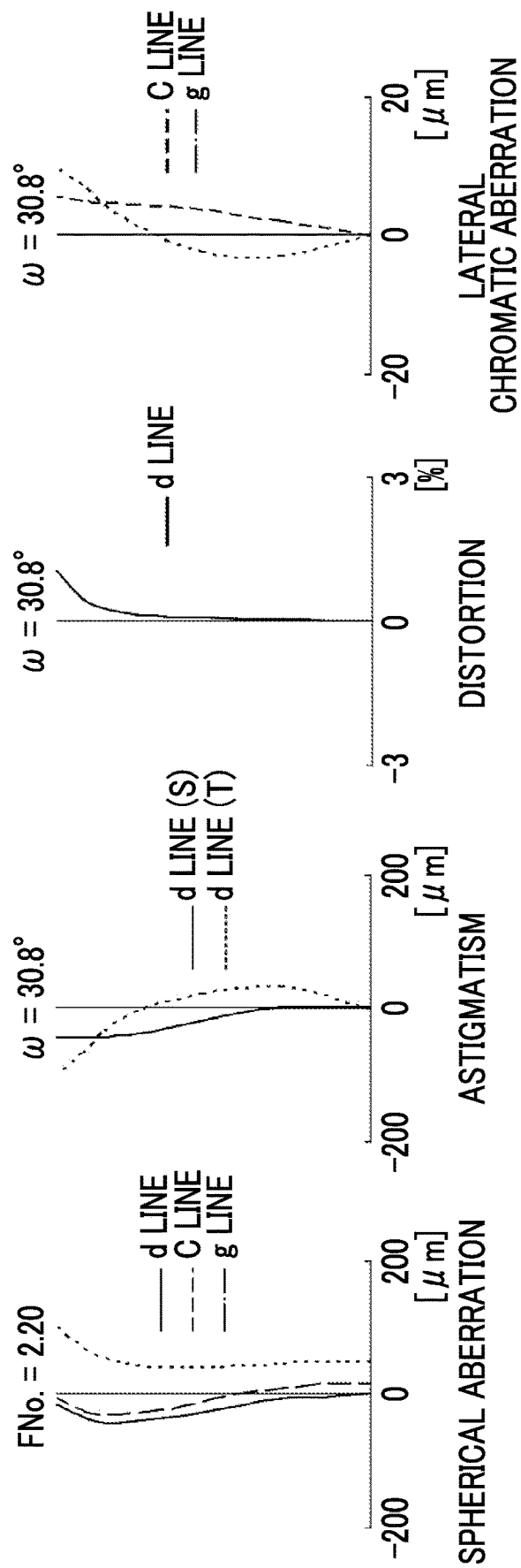
FIG. 8 is a diagram of aberrations of the imaging lens of Example 2 of the present disclosure.

FIG. 3 is a cross-sectional view showing a configuration of the imaging lens of Example 2. The imaging lens of Example 2 has the same configuration as the outline of the imaging lens of Example 1. Regarding the imaging lens of Example 2, Table 4 shows basic lens data, Table 5 shows specification, and Table 6 shows aspheric surface coefficients thereof, and FIG. 8 shows aberration diagrams.

TABLE 4

| | Example 2 | | | |
|---|---|---|---|---|
| Sn | R | D | Nd | νd |
| 1 | 31.86309 | 0.910 | 1.66603 | 32.43 |
| 2 | 10.50300 | 2.770 | 1.88300 | 39.22 |
| 3 | 62.88959 | 0.800 | | |
| 4(St) | ∞ | 6.600 | | |
| 5 | −11.21771 | 0.530 | 1.81668 | 24.17 |
| 6 | 39.06256 | 4.233 | 1.88300 | 39.22 |
| 7 | −18.72483 | 0.200 | | |
| *8 | 36.26884 | 5.800 | 1.80610 | 40.73 |
| *9 | −25.62334 | 1.050 | | |
| *10 | 149.93212 | 2.200 | 1.51633 | 64.06 |
| *11 | 58.82042 | 6.171 | | |
| 12 | −13.34841 | 0.600 | 1.53000 | 49.37 |
| 13 | −864.65562 | 0.120 | | |
| 14 | 79.35941 | 2.000 | 1.73227 | 57.41 |
| 15 | ∞ | 2.512 | | |
| 16 | ∞ | 1.300 | 1.51680 | 64.20 |
| 17 | ∞ | 0.500 | | |

TABLE 5

| Example 2 | |
|---|---|
| f | 23.553 |
| Bf | 3.869 |
| FNo. | 2.20 |
| 2ω(°) | 61.6 |
| TL | 37.85 |
| Ymax | 14.20 |

TABLE 6

| | Example 2 | | | |
|---|---|---|---|---|
| Sn | 8 | 9 | 10 | 11 |
| KA | 1.0000000E+00 | 1.0000000E+00 | 1.0000000E+00 | 1.0000000E+00 |
| A4 | 1.6705793E−05 | 7.8275480E−05 | 3.3793623E−05 | −1.6845284E−05 |
| A6 | 5.1939541E−07 | −1.6517835E−07 | −1.8152530E−06 | −1.5047041E−06 |
| A8 | −6.2527373E−09 | 1.2406097E−09 | 1.8048115E−08 | 2.1174211E−08 |
| A10 | −3.2429676E−11 | 9.0642044E−12 | −4.6946102E−11 | −1.0806345E−10 |

TABLE 6-continued

| | Example 2 | | | |
|---|---|---|---|---|
| Sn | 8 | 9 | 10 | 11 |
| A12 | 2.2492654E−12 | 3.0987069E−14 | 1.0605989E−13 | −4.0472750E−13 |
| A14 | −2.6464418E−14 | −1.4961496E−15 | −8.5634348E−15 | 6.4755033E−15 |
| A16 | 7.9958127E−17 | 2.6318927E−18 | 1.8405033E−16 | 6.3886866E−17 |
| A18 | 5.4706112E−19 | 2.1442625E−19 | −1.0905465E−18 | −7.4471571E−19 |
| A20 | −3.1850412E−21 | −1.4836551E−21 | 1.1326509E−21 | 1.6656250E−21 |

Example 3

Figure 4:
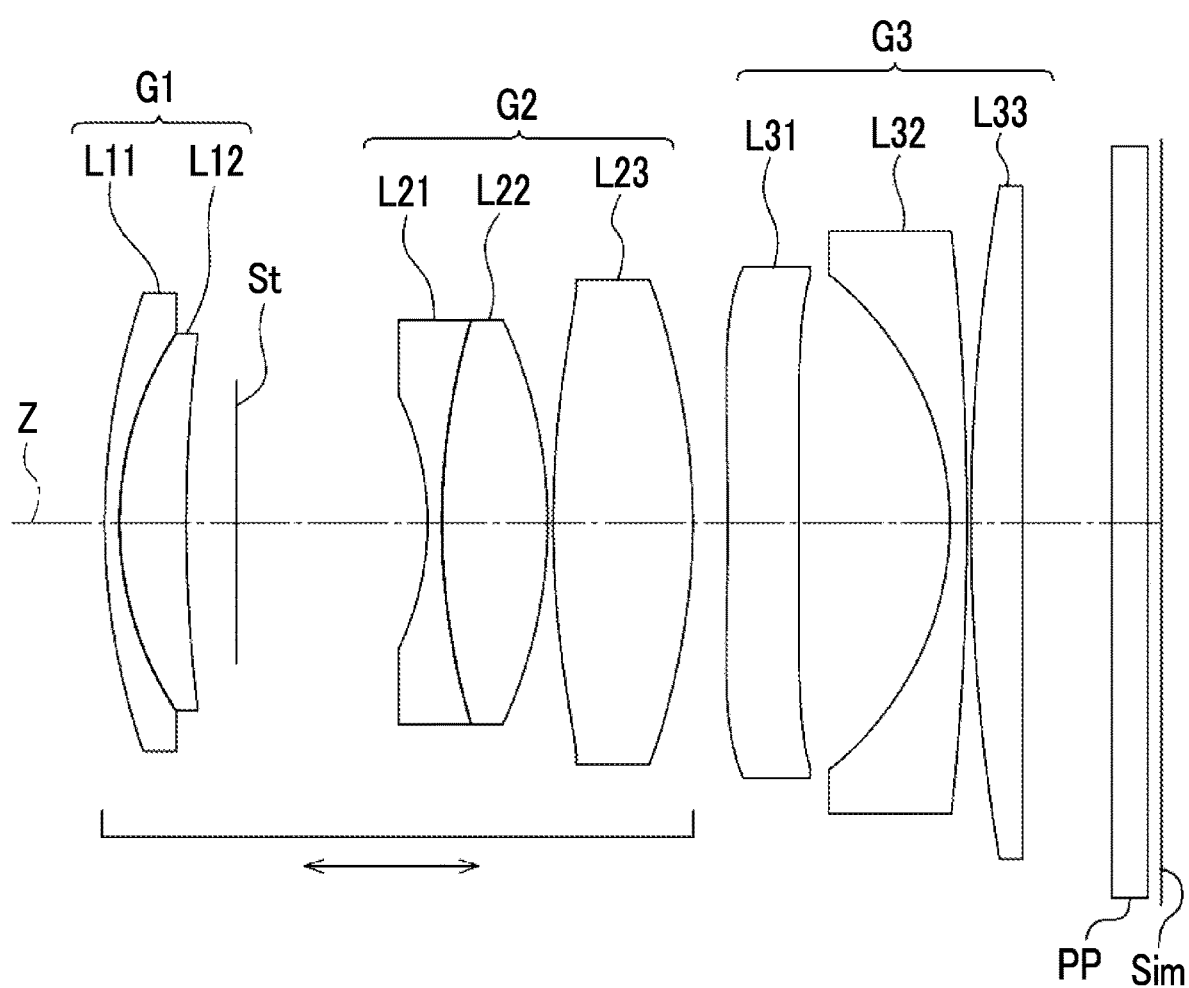
FIG. 4 is a cross-sectional view showing a configuration and rays of an imaging lens according to Example 3 of the present disclosure.
Figure 9:
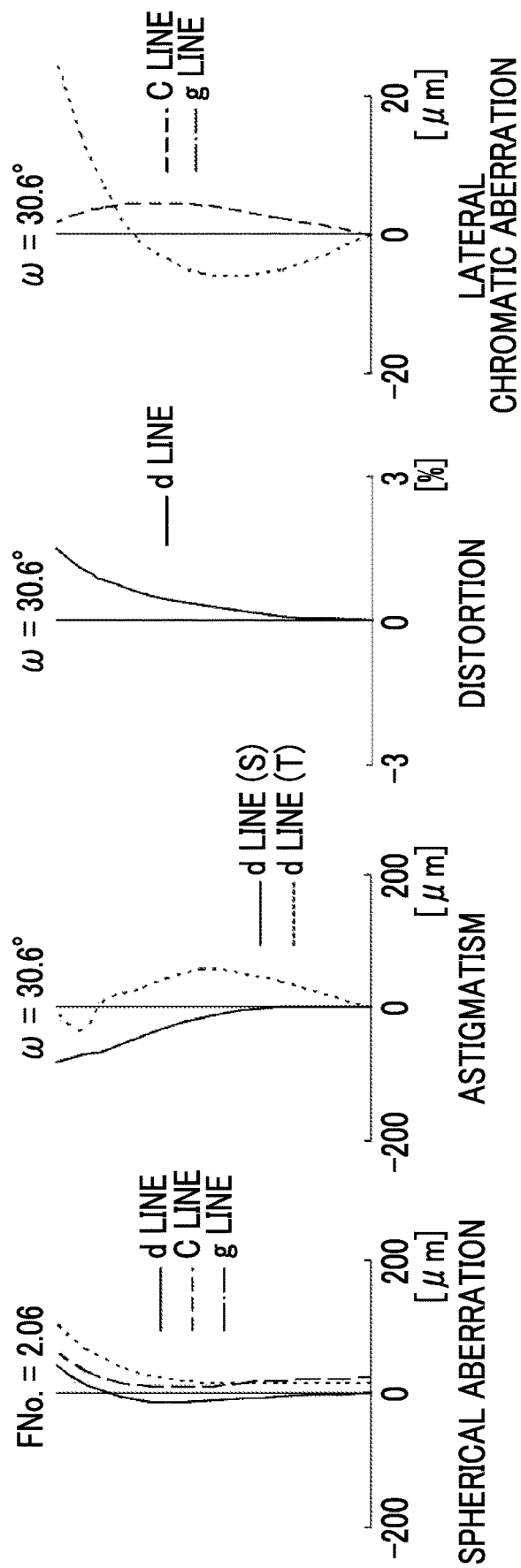
FIG. 9 is a diagram of aberrations of the imaging lens of Example 3 of the present disclosure.

FIG. 4 is a cross-sectional view showing a configuration of the imaging lens of Example 3. The imaging lens of Example 3 has the same configuration as the outline of the imaging lens of Example 1. Regarding the imaging lens of Example 3, Table 7 shows basic lens data, Table 8 shows specification, and Table 9 shows aspheric surface coefficients thereof, and FIG. 9 shows aberration diagrams.

TABLE 7

| | Example 3 | | | |
|---|---|---|---|---|
| Sn | R | D | Nd | vd |
| 1 | 26.74042 | 0.530 | 1.74077 | 27.79 |
| 2 | 13.06075 | 2.400 | 1.88300 | 39.22 |
| 3 | 58.74897 | 1.800 | | |
| 4(St) | ∞ | 6.886 | | |
| 5 | −11.08523 | 0.520 | 1.76182 | 26.52 |
| 6 | 27.36529 | 3.800 | 1.88300 | 39.22 |
| 7 | −18.25742 | 0.200 | | |
| *8 | 39.98090 | 5.000 | 1.80610 | 40.73 |

TABLE 7-continued

| | Example 3 | | | |
|---|---|---|---|---|
| Sn | R | D | Nd | vd |
| *9 | −24.10765 | 1.252 | | |
| *10 | −107.61836 | 2.570 | 1.51760 | 63.50 |
| *11 | −360.42011 | 5.438 | | |
| 12 | −11.83321 | 0.610 | 1.62588 | 35.70 |
| 13 | −104.66423 | 0.150 | | |
| 14 | 77.02833 | 1.850 | 1.76200 | 40.10 |
| 15 | ∞ | 3.203 | | |
| 16 | ∞ | 1.300 | 1.51680 | 64.20 |
| 17 | ∞ | 0.500 | | |

TABLE 8

| Example 3 | |
|---|---|
| f | 23.670 |
| Bf | 4.560 |
| FNo. | 2.06 |
| 2ω(°) | 61.2 |
| TL | 37.57 |
| Ymax | 14.20 |

TABLE 9

| | Example 3 | | | |
|---|---|---|---|---|
| Sn | 8 | 9 | 10 | 11 |
| KA | 1.0000000E+00 | 1.0000000E+00 | 1.0000000E+00 | 1.0000000E+00 |
| A4 | −6.1075244E−06 | 4.3548047E−05 | 8.1886493E−05 | 4.4600956E−05 |
| A6 | −2.3956172E−09 | −8.6764879E−08 | 2.4228543E−07 | 8.6113251E−08 |
| A8 | −9.6168237E−10 | −1.9579760E−11 | 1.1286575E−09 | 1.8201452E−09 |
| A10 | −5.6017673E−12 | −8.2242257E−12 | 7.5974704E−12 | 5.6895575E−12 |
| A12 | −4.9653673E−14 | −5.1101334E−14 | 4.4542992E−14 | 2.7631387E−14 |
| A14 | −6.5135868E−16 | −1.2916471E−16 | 1.8573354E−16 | 4.7971052E−16 |
| A16 | 5.3856444E−18 | 4.1126898E−18 | −5.6130094E−19 | 6.3299884E−18 |
| A18 | −1.6111486E−19 | −3.1680231E−19 | −1.4764204E−21 | 4.2645060E−20 |
| A20 | −2.8157439E−21 | 3.8546092E−22 | −4.8611564E−22 | −1.5732072E−22 |

Example 4

Figure 5:
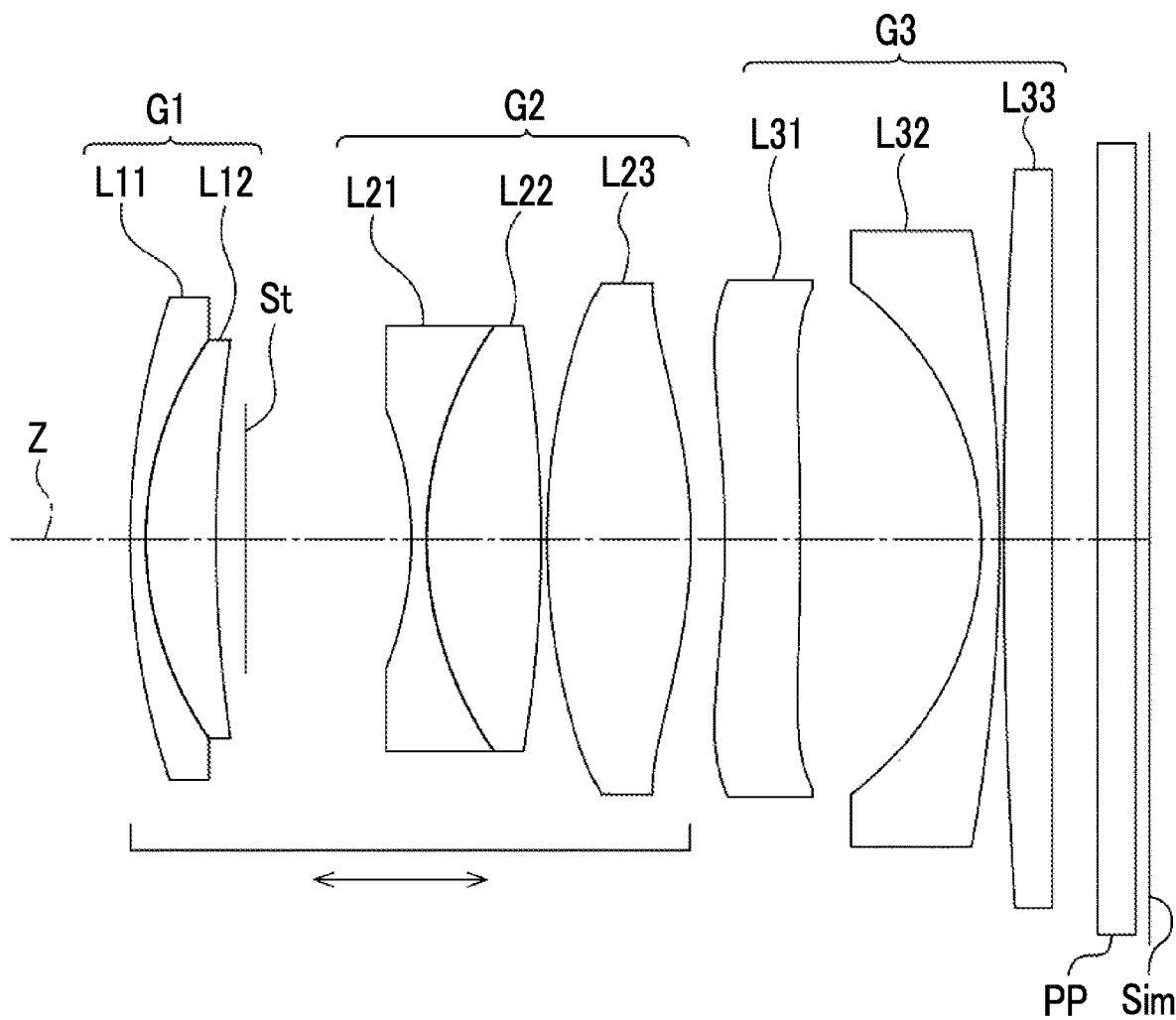
FIG. 5 is a cross-sectional view showing a configuration and rays of an imaging lens according to Example 4 of the present disclosure.
Figure 10:
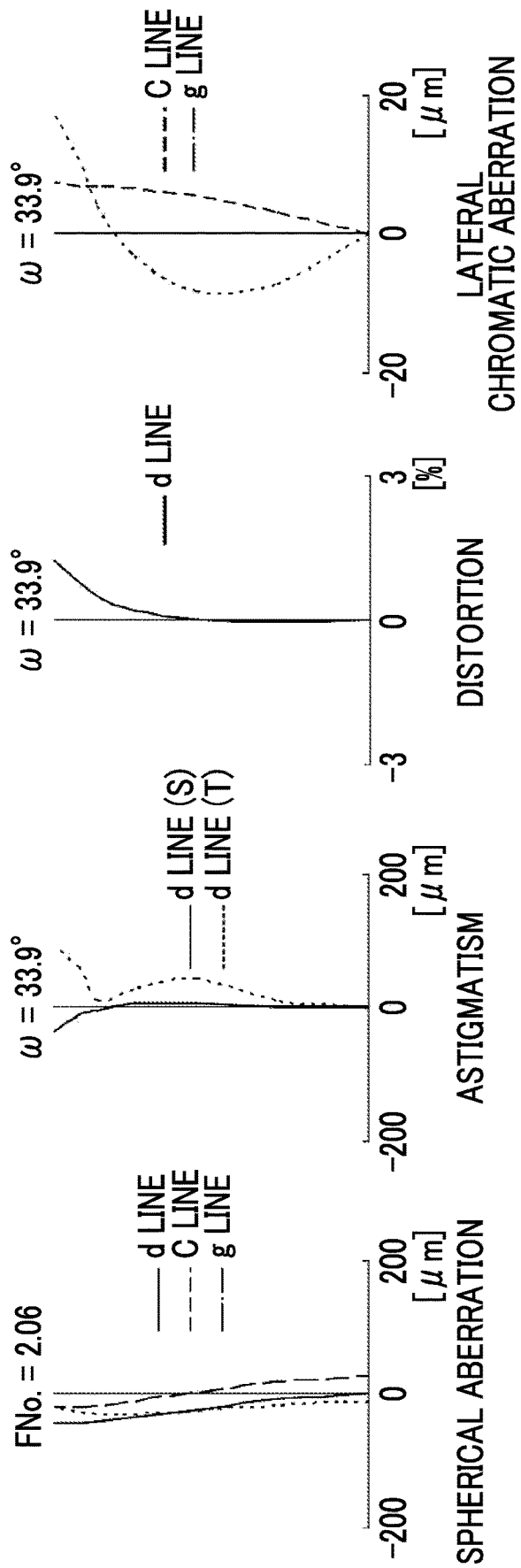
FIG. 10 is a diagram of aberrations of the imaging lens of Example 4 of the present disclosure.

FIG. 5 is a cross-sectional view showing a configuration of the imaging lens of Example 4. The imaging lens of Example 4 has the same configuration as the outline of the imaging lens of Example 1. Regarding the imaging lens of Example 4, Table 10 shows basic lens data, Table 11 shows specification, and Table 12 shows aspheric surface coefficients thereof, and FIG. 10 shows aberration diagrams.

TABLE 10

Example 4

| Sn | R | D | Nd | vd |
|---|---|---|---|---|
| 1 | 27.56995 | 0.530 | 1.68695 | 30.67 |
| 2 | 12.47933 | 2.400 | 1.88300 | 39.22 |
| 3 | 50.00116 | 1.000 | | |
| 4(St) | ∞ | 5.681 | | |
| 5 | −12.44672 | 0.520 | 1.74304 | 27.33 |
| 6 | 13.26214 | 3.909 | 1.88300 | 39.22 |
| 7 | −46.78914 | 0.200 | | |
| *8 | 25.16512 | 4.889 | 1.86251 | 41.75 |
| *9 | −17.68381 | 1.173 | | |
| *10 | −31.75573 | 2.570 | 1.51760 | 63.50 |
| *11 | −95.58334 | 6.200 | | |
| 12 | −11.29951 | 0.610 | 1.62477 | 35.52 |
| 13 | −62.36522 | 0.150 | | |
| 14 | 219.94552 | 1.650 | 1.48749 | 70.24 |
| 15 | ∞ | 1.548 | | |
| 16 | ∞ | 1.300 | 1.51680 | 64.20 |
| 17 | ∞ | 0.500 | | |

TABLE 11

Example 4

| | |
|---|---|
| f | 20.875 |
| Bf | 2.905 |
| FNo. | 2.06 |
| 2ω(°) | 67.8 |
| TL | 34.39 |
| Ymax | 14.20 |

TABLE 12

Example 4

| Sn | 8 | 9 | 10 | 11 |
|---|---|---|---|---|
| KA | 1.0000000E+00 | 1.0000000E+00 | 1.0000000E+00 | 1.0000000E+00 |
| A4 | 2.7557228E−06 | 1.6407358E−04 | 1.6559670E−04 | 2.0372456E−05 |
| A6 | 7.4158631E−08 | −3.3873613E−07 | 7.1339155E−08 | 1.4728684E−06 |
| A8 | 5.9431542E−09 | −1.9873992E−09 | 6.8406721E−10 | −7.2302917E−09 |
| A10 | −1.0827947E−10 | 3.1430137E−10 | 4.1755449E−11 | 6.4601048E−11 |
| A12 | 1.2249662E−12 | −6.3509090E−12 | 8.0023031E−13 | 1.8265700E−13 |
| A14 | −1.9477283E−14 | 6.4091825E−14 | −3.2454279E−15 | 2.2127411E−15 |
| A16 | 4.4573666E−16 | −2.6494196E−16 | −3.0471935E−17 | 1.3090126E−17 |
| A18 | −4.0477453E−18 | 1.4342811E−18 | −2.2505804E−19 | 6.1942496E−19 |
| A20 | 1.1441942E−20 | −1.1879380E−20 | −1.7600906E−22 | −9.3692243E−21 |

Example 5

Figure 6:
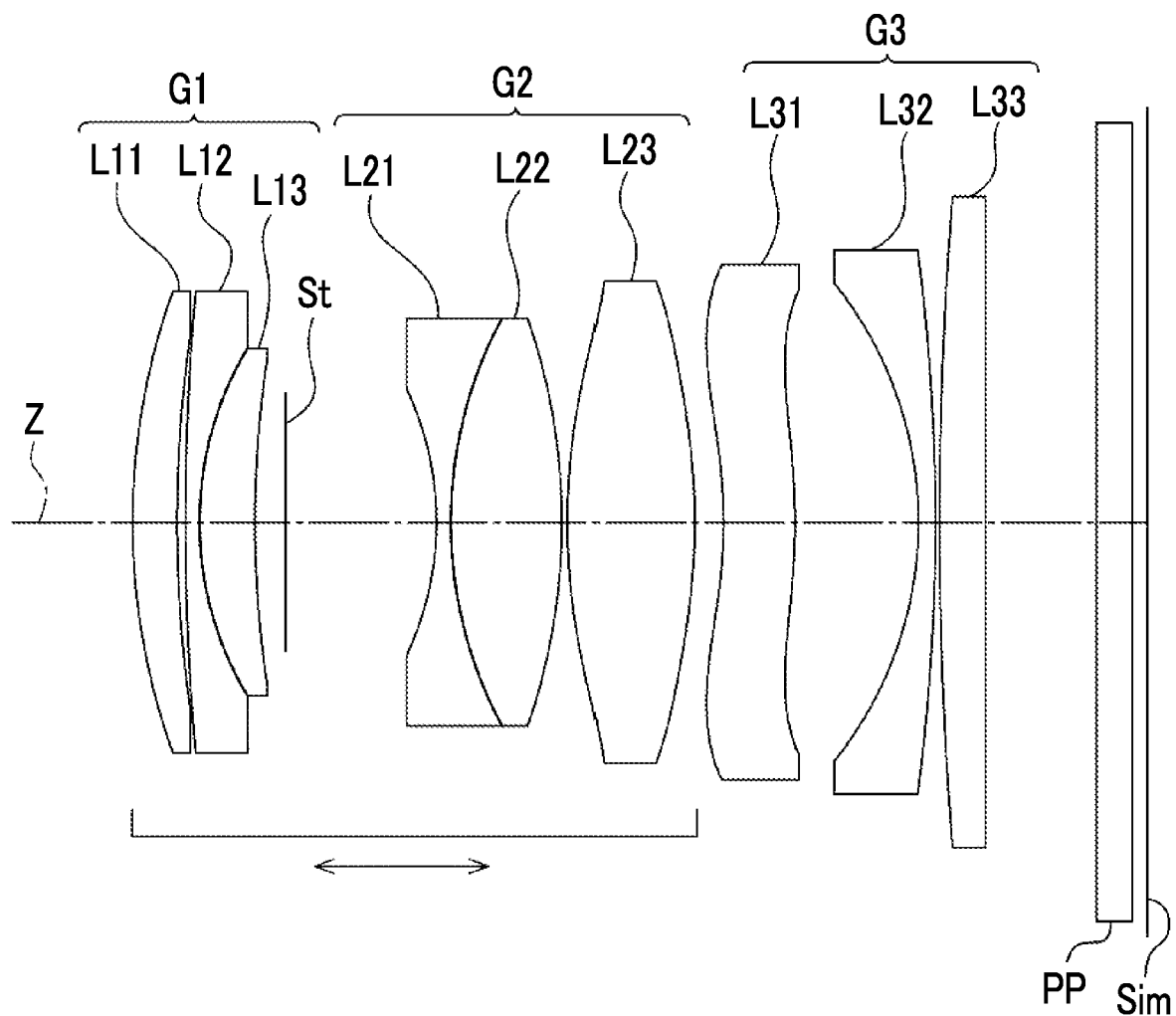
FIG. 6 is a cross-sectional view showing a configuration and rays of an imaging lens according to Example 5 of the present disclosure.
Figure 11:
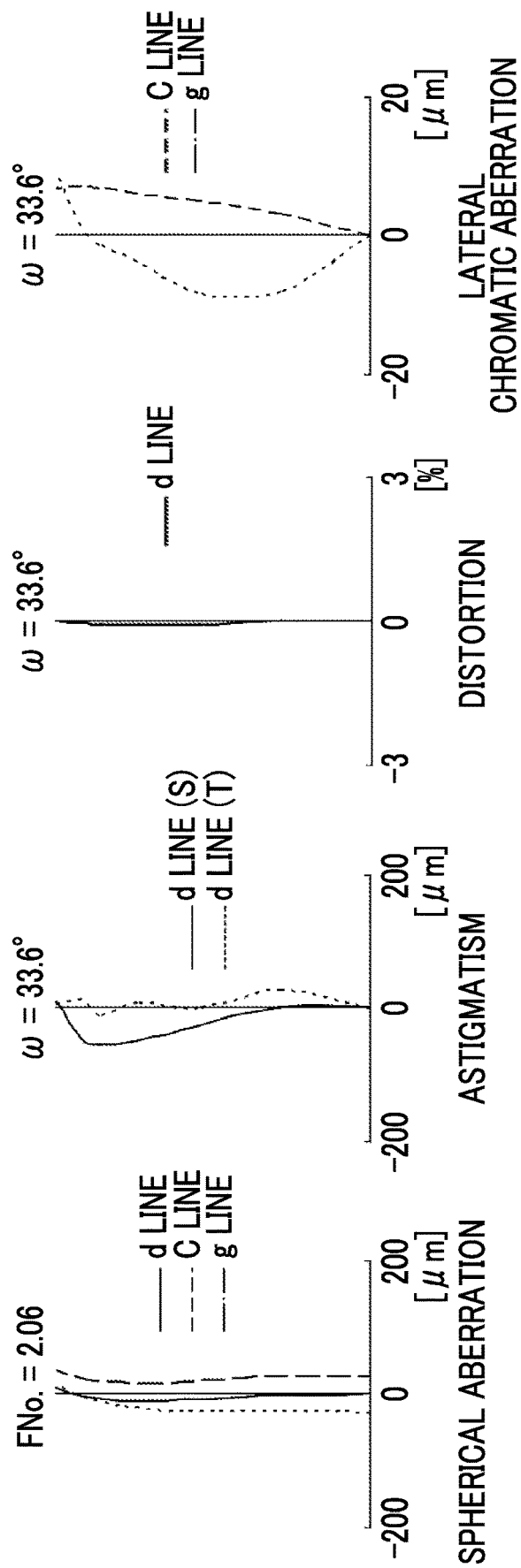
FIG. 11 is a diagram of aberrations of the imaging lens of Example 5 of the present disclosure.

FIG. 6 is a cross-sectional view showing a configuration of the imaging lens of Example 5. The imaging lens of Example 5 is configured to be similar to the outline of the imaging lens of Example 1 except the following points. The first lens group G1 consists of three lenses L11 to L13 in order from the object side to the image side, the lens L11 is a single lens, and the lens L12 and the lens L13 are cemented to each other. Regarding the imaging lens of Example 5, Table 13 shows basic lens data, Table 14 shows specification, and Table 15 shows aspheric surface coefficients thereof, and FIG. 11 shows aberration diagrams.

TABLE 13

Example 5

| Sn | R | D | Nd | vd |
|---|---|---|---|---|
| 1 | 25.64243 | 1.600 | 2.00100 | 29.14 |
| 2 | 49.99752 | 0.300 | | |
| 3 | 98.00533 | 0.510 | 1.67337 | 29.31 |
| 4(St) | 12.71720 | 2.000 | 1.88300 | 39.22 |
| 5 | 40.84351 | 1.100 | | |
| 6 | ∞ | 5.439 | | |
| 7 | −11.67828 | 0.520 | 1.73032 | 25.84 |
| *8 | 16.19330 | 4.000 | 1.88300 | 39.22 |
| *9 | −23.45561 | 0.200 | | |
| *10 | 24.69136 | 4.550 | 1.95150 | 29.83 |
| *11 | −23.38539 | 1.044 | | |
| 12 | −16.94361 | 2.570 | 2.00178 | 19.32 |
| 13 | −23.65924 | 4.451 | | |
| 14 | −14.28013 | 0.610 | 1.78880 | 28.43 |
| 15 | −78.74535 | 0.150 | | |
| 16 | 153.82348 | 1.650 | 1.48749 | 70.24 |
| 17 | ∞ | 4.047 | | |
| 1 | ∞ | 1.300 | 1.51680 | 64.20 |
| 2 | ∞ | 0.500 | | |

TABLE 14

Example 5

| f | 21.727 |
|---|---|
| Bf | 5.404 |
| FNo. | 2.06 |
| 2ω(°) | 68.2 |
| TL | 36.10 |
| Ymax | 14.20 |

TABLE 15

Example 5

| Sn | 10 | 11 | 12 | 13 |
|---|---|---|---|---|
| KA | 1.0000000E+00 | 1.0000000E+00 | 1.0000000E+00 | 1.0000000E+00 |
| A4 | −4.8237017E−06 | 1.1459903E−04 | 3.8514845E−04 | 2.9119470E−04 |
| A6 | −2.7333829E−07 | −2.3258279E−07 | 5.2031997E−07 | 4.2501349E−07 |
| A8 | −7.2954409E−09 | −2.4199832E−09 | −1.9200049E−08 | 1.8639268E−08 |
| A10 | 7.6148923E−11 | −1.3100861E−10 | 6.6201057E−11 | −5.2068971E−10 |
| A12 | −1.2879013E−12 | 4.0103452E−13 | 6.9621249E−13 | 3.2376678E−12 |
| A14 | 3.3086373E−14 | 2.2733021E−14 | −1.0616546E−14 | 5.9754505E−14 |
| A16 | −7.5460779E−16 | −3.0600841E−6 | 3.8757329E−17 | −1.0672174E−15 |
| A18 | 7.1921248E−18 | 1.2870714E−18 | 1.1763391E−18 | 2.3353470E−18 |
| A20 | −1.8715723E−20 | 3.2991243E−21 | −7.8829592E−21 | 2.9753586E−20 |

Table 16 shows values corresponding to Conditional Expressions (1) to (6) of the imaging lenses of Examples 1 to 5. In Examples 1 to 5, the d line is set as the reference wavelength. Table 16 shows the values on the d line basis.

TABLE 16

| Expression Number | | Example 1 | Example 2 | Example 3 | Example 4 | Example 5 |
|---|---|---|---|---|---|---|
| (1) | $\dfrac{Ra + Rb}{Ra - Rb}$ | 0.02 | 0.17 | 0.25 | 0.17 | 0.03 |
| (2) | $\dfrac{FNo \times TL}{Ymax}$ | 5.56 | 5.86 | 5.45 | 4.99 | 5.24 |
| (3) | fG12/f | 0.79 | 0.81 | 0.78 | 0.73 | 0.64 |
| (4) | f/Ymax | 1.67 | 1.66 | 1.67 | 1.47 | 1.53 |
| (5) | $\dfrac{Rc + Ra}{Rc - Ra}$ | −0.39 | −0.32 | −0.37 | 0.30 | −0.03 |
| (6) | Nd23 | 1.80780 | 1.80610 | 1.80610 | 1.86251 | 1.95150 |

As can be seen from the above data, the imaging lenses of Examples 1 to 5 each have an F number of 2.2 or less which is a small F number while being configured to have a small size, and it is possible to achieve a high resolution and realize high optical performance by satisfactorily correcting various aberrations.

Figure 12:
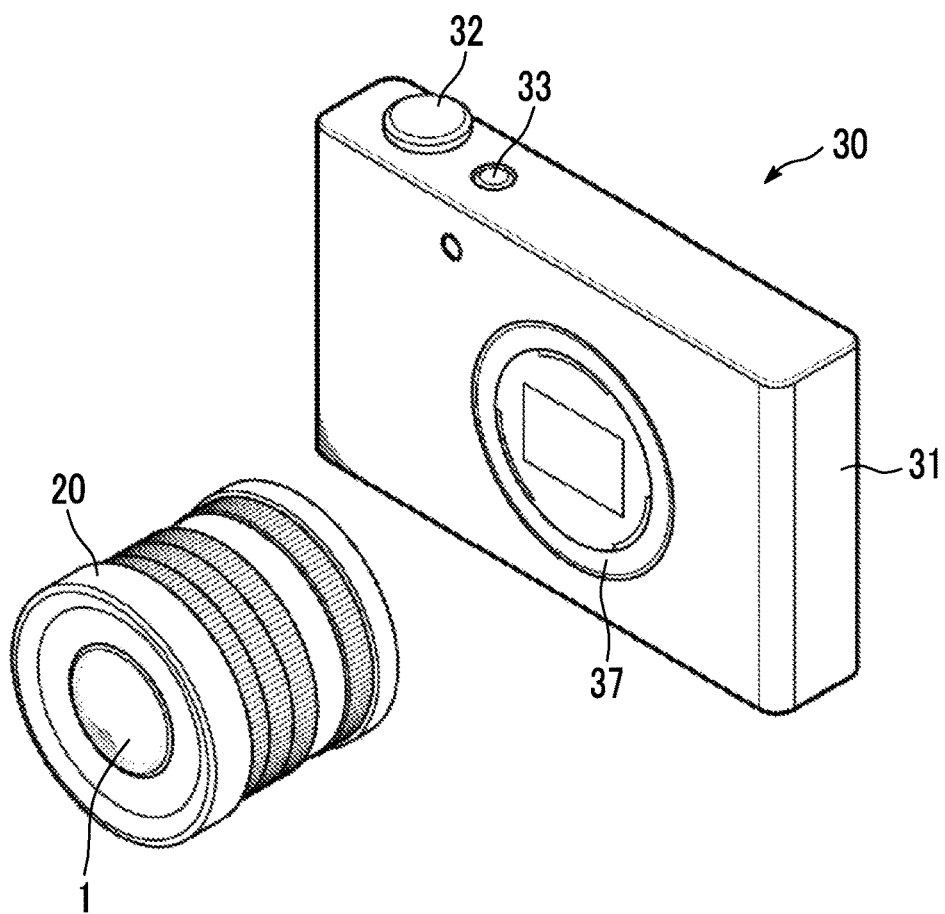
FIG. 12 is a perspective view of the front side of an imaging apparatus according to an embodiment of the present disclosure.
Figure 13:
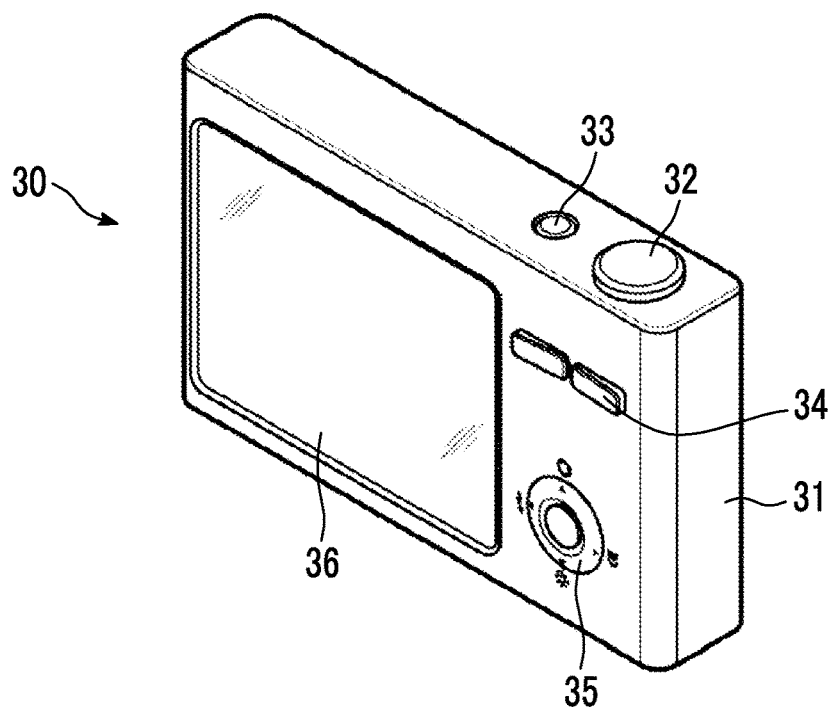
FIG. 13 is a perspective view of the rear side of an imaging apparatus according to an embodiment of the present disclosure.

Next, an imaging apparatus according to an embodiment of the present disclosure will be described. FIGS. 12 and 13 are external views of a camera 30 which is the imaging apparatus according to the embodiment of the present disclosure. FIG. 12 is a perspective view of the camera 30 viewed from the front side, and FIG. 13 is a perspective view of the camera 30 viewed from the rear side. The camera 30 is a so-called mirrorless type digital camera, and the interchangeable lens 20 can be detachably attached thereto. The interchangeable lens 20 is configured to include the imaging lens 1, which is housed in a lens barrel, according to an embodiment of the present disclosure.

The camera 30 comprises a camera body 31, and a shutter button 32 and a power button 33 are provided on an upper surface of the camera body 31. Further, an operation section 34, an operation section 35, and a display section 36 are provided on a rear surface of the camera body 31. The display section 36 displays a captured image and an image within an angle of view before imaging.

An imaging aperture, through which light from an imaging target is incident, is provided at the center on the front surface of the camera body 31. A mount 37 is provided at a position corresponding to the imaging aperture. The interchangeable lens 20 is mounted on the camera body 31 with the mount 37 interposed therebetween.

In the camera body 31, there are provided an imaging element, a signal processing circuit, a storage medium, and the like. The imaging element such as a charge coupled device (CCD) or a complementary metal oxide semiconductor (CMOS) outputs a captured image signal based on a subject image which is formed through the interchangeable lens 20. The signal processing circuit generates an image through processing of the captured image signal which is output from the imaging element. The storage medium stores the generated image. The camera 30 is able to capture a still image or a video by pressing the shutter button 32, and is able to store image data, which is obtained through imaging, in the storage medium.

The technology of the present disclosure has been hitherto described through embodiments and examples, but the technology of the present disclosure is not limited to the above-mentioned embodiments and examples, and may be modified into various forms. For example, values such as the radius of curvature, the surface distance, the refractive index, the Abbe number, and the aspheric surface coefficient of each lens are not limited to the values shown in the examples, and different values may be used therefor.

Further, the imaging apparatus according to the embodiment of the present disclosure is not limited to the above example, and may be modified into various forms such as a camera other than the mirrorless type, a film camera, and a video camera.

What is claimed is:

1. An imaging lens consisting of, in order from an object side to an image side: a first lens group having a positive refractive power; a stop; a second lens group having a positive refractive power; and a third lens group having a negative refractive power,
wherein during focusing, the first lens group and the second lens group move along an optical axis integrally, and the third lens group remains stationary with respect to an image plane,
wherein the first lens group consists of three or less lenses,
wherein a lens surface closest to the object side in the first lens group is convex,
wherein the first lens group includes a cemented lens in which a negative lens and a positive lens are cemented in order from the object side and of which a cemented surface is convex toward the object side,
wherein the second lens group includes a cemented lens, in which at least one negative lens and at least one positive lens are cemented, and a lens different from the cemented lens,
wherein a lens closest to the image side in the second lens group is a biconvex lens,
wherein the third lens group consists of, in order from the object side to the image side, an aspheric lens having a negative refractive power, a negative lens, and a positive lens, and
wherein assuming that a paraxial radius of curvature of an object side surface of the biconvex lens of the second lens group is Ra and a paraxial radius of curvature of an image side surface of the biconvex lens of the second lens group is Rb, Conditional Expression (1) is satisfied, which is represented by $$0<(Ra+Rb)/(Ra-Rb)<1 \tag{1}.$$

2. The imaging lens according to claim 1, wherein assuming that
an F number of the imaging lens is FNo,
a sum of a distance on the optical axis from a lens surface closest to the object side to a lens surface closest to the image side and a back focal length of the imaging lens at an air conversion distance in a state in which an object at infinity is in focus is TL, and
a maximum image height is Ymax,
Conditional Expression (2) is satisfied, which is represented by $$3.5<FNo\times TL/Y\text{max}<7 \tag{2}.$$

3. The imaging lens according to claim 2, wherein Conditional Expression (2-1) is satisfied, which is represented by $$4<FNo\times TL/Y\text{max}<6 \tag{2-1}.$$

4. The imaging lens according to claim 1, wherein assuming that
a combined focal length of the first lens group and the second lens group is fG12, and
a focal length of the imaging lens in a state where an object at infinity is in focus is f,
Conditional Expression (3) is satisfied, which is represented by $$0.6<fG12/f<0.9 \tag{3}.$$

5. The imaging lens according to claim 4, wherein Conditional Expression (3-1) is satisfied, which is represented by $$0.6<fG12/f<0.85 \tag{3-1}.$$

6. The imaging lens according to claim 1, wherein assuming that
a focal length of the imaging lens in a state where an object at infinity is in focus is f, and a maximum image height is Ymax,
Conditional Expression (4) is satisfied, which is represented by $$1 < f/Y\max < 1.8 \qquad (4).$$

7. The imaging lens according to claim 6, wherein Conditional Expression (4-1) is satisfied, which is represented by $$1.45 < f/Y\max < 1.7 \qquad (4\text{-}1).$$

8. The imaging lens according to claim 1, wherein a lens surface closest to the object side in the second lens group is a concave surface.

9. The imaging lens according to claim 1, wherein the second lens group consists of, in order from the object side to the image side, a negative lens concave toward the object side, a positive lens convex toward the image side, and an aspheric lens.

10. The imaging lens according to claim 1, wherein assuming
a paraxial radius of curvature of an image side surface of a lens which is second from the image side of the second lens group is Rc,
Conditional Expression (5) is satisfied, which is represented by $$-0.5 < (Rc+Ra)/(Rc-Ra) < 0.5 \qquad (5).$$

11. The imaging lens according to claim 10, wherein Conditional Expression (5-1) is satisfied, which is represented by $$-0.45 < (Rc+Ra)/(Rc-Ra) < 0.45 \qquad (5\text{-}1).$$

12. The imaging lens according to claim 1, wherein assuming that
a refractive index of the biconvex lens of the second lens group with respect to the d line is Nd23,
Conditional Expression (6) is satisfied, which is represented by $$1.75 < Nd23 \qquad (6)$$

13. The imaging lens according to claim 12, wherein Conditional Expression (6-1) is satisfied, which is represented by $$1.8 < Nd23 < 2.2 \qquad (6\text{-}1).$$

14. The imaging lens according to claim 1, wherein Conditional Expression (1-1) is satisfied, which is represented by $$0 < (Ra+Rb)/(Ra-Rb) < 0.3 \qquad (1\text{-}1).$$

15. An imaging apparatus comprising the imaging lens according to claim 1.

* * * * *